Patented Apr. 2, 1929.

1,707,471

UNITED STATES PATENT OFFICE.

JAY G. DE REMER, OF GREENWICH, CONNECTICUT, ASSIGNOR TO SAVAGE-DE REMER CORPORATION, OF NEW YORK, N. Y., A CORPORATION OF NEW YORK.

ART OF PURIFYING MERCURY.

No Drawing.   Application filed October 11, 1924.   Serial No. 743,139.

This invention relates to apparatus wherein mercury is used in contact with other fluid material and its object is to prevent the formation of solid matter as the result of such contact and thereby eliminate the possibility of interference, by such solid matter, with the operation or use of the apparatus; more especially the purpose is to prepare or purify mercury so that its use in contact with ethyl-chloride will not produce solid matter, and in this relation the invention is useful in connection with refrigerating apparatus of the type shown in my prior Patent No. 1,373,174, wherein mercury is employed as the piston means for compressing and condensing ethyl-chloride which may constitute the refrigerant medium in that apparatus. Difficulty has been experienced in the practical use of such refrigerating apparatus, from the development of a deposit in or from the mercury, tending to clog the passages of the circulating system and interfering with its regulation and operation.

I have found that the reaction or coaction between the fluid and the mercury, which produces the solid matter referred to, is limited in extent, and that by bringing the mercury and the fluid into very intimate and thorough contact, the capacity of the mercury to produce such solid matter can be permanently exhausted. My invention accordingly consists in treating mercury by thoroughly mixing it with, or exposing it to, a quantity of the particular fluid with which it is later to be used until the production of such solid matter comes to an end, and then separating the mercury therefrom.

The process is carried out in practice by enclosing the mercury in a container together with a quantity of ethyl chloride and then revolving or shaking the container so as to produce intimate contact between them. This operation is continued for about thirty-six hours, more or less and according to circumstances, or until the formation of solid matter is determined to have ceased or to have become negligible, and then the deposit is skimmed or poured off the surface of the mercury. The mercury is thus thoroughly washed with the ethyl chloride.

Preferably, the washing is done in stages, which shortens the time required. After, say, ten or twelve hours the fluid is drawn off with the solid matter produced up to that point, and substituted by fresh fluid, and toward the end of the process, it is changed again. Ordinarily more than two changes are considered unnecessary. The ethyl-chloride or wash fluid which has become dirty from use is used over again after filtration, for treating the same or other batches of mercury.

Mercury thus treated is thereby adapted for indefinite use in contact with ethyl-chloride and will not produce any non-fluid deposit or interior coating on the wall of its container.

I claim:

1. The process of preparing mercury which consists in mixing the same with ethyl-chloride until the development of solid matter as the result of such mixing substantially ceases, and then separating the mercury and the solid matter.

2. The process of preparing mercury for use in contact with a refrigerant medium, which consists in thoroughly agitating the mercury with the refrigerant in its liquid form thereby developing solid matter in the mixture, continuing such agitation until the development of said matter ceases or becomes negligible and then separating the so-developed matter from the mercury.

In testimony whereof, I have signed this specification.

JAY G. DE REMER.